(12) United States Patent
Okamura et al.

(10) Patent No.: US 6,468,654 B1
(45) Date of Patent: Oct. 22, 2002

(54) RUBBER-REINFORCEMENT GLASS FIBER PRODUCT

(75) Inventors: Akira Okamura; Masato Sekiguchi, both of Tsu (JP)

(73) Assignee: Nippon Glass Fiber Co., Ltd. (JP)

( * ) Notice: Subject to any disclaimer, the term of this patent is extended or adjusted under 35 U.S.C. 154(b) by 0 days.

(21) Appl. No.: 09/133,562

(22) Filed: Aug. 13, 1998

Related U.S. Application Data

(62) Division of application No. 08/594,938, filed on Jan. 31, 1996, now Pat. No. 5,885,718, which is a division of application No. 08/244,911, filed on Jan. 14, 1994, now Pat. No. 5,523,154.

(51) Int. Cl.$^7$ .................................................. B32B 9/00
(52) U.S. Cl. ...................... 428/390; 428/373; 428/375; 428/378; 428/407; 428/461; 428/113; 428/105; 428/295.4; 428/357; 428/359; 428/367; 428/372; 442/172; 442/180; 156/137; 156/307.3; 156/330; 156/333; 156/910; 156/407.1
(58) Field of Search ................................. 428/373, 375, 428/378, 390, 407, 441, 113, 105, 295.4, 357, 359, 367, 372; 156/137, 307.3, 330, 333, 910, 407.1; 442/172, 180

(56) References Cited

U.S. PATENT DOCUMENTS 5,077,127 A * 12/1991 Mori et al. .................. 428/390

* cited by examiner

*Primary Examiner*—Richard Weisberger
(74) *Attorney, Agent, or Firm*—Lorusso & Loud

(57) ABSTRACT

A treating agent comprises a nitrile group-containing highly saturated polymer rubber latex (A) having an iodine value of 120 or less, a rubber latex (B) other than the highly saturated polymer rubber latex, and a water-soluble resorcinol/formaldehyde condensate in amounts of 15 to 80%, 5 to 70% and 2 to 15%, all by weight in terms of solids, respectively. A rubber-reinforcing fiber product is coated with the treating agent. A rubber article such as a toothed belt, a tire and the like is made using this rubber-reinforcing fiber product. The glass fiber product coated with the treating agent may be further coated with a halogen-containing polymer-based adhesive as a secondary treating agent. Thus, the treating agent exhibits a large bonding force between the reinforcing fiber product and a matrix. Even if the rubber article is repeatedly subjected to a flexing stress, the strength thereof cannot be reduced. A peel-off cannot occurs between the reinforcing fiber product and the rubber matrix. Moreover, the rubber article has sufficient heat and water resistances.

16 Claims, 1 Drawing Sheet

RUBBER-REINFORCEMENT GLASS FIBER PRODUCT

CROSS REFERENCE TO RELATED APPLICATIONS

This application is a division of U.S. Ser. No. 08/594,938 filed Jan. 31, 1996 now U.S. Pat. No. 5,885,718 which is a division of U.S. Ser. No. 08/244,911 which issued Jun. 4, 1996 as U.S. Pat. No. 5,523,154.

TECHNICAL FIELD

The present invention relates to a glass fiber coating composition, a rubber-reinforcing glass fiber product coated with the coating composition, and a rubber article such as a rubber belt, a tire and the like, formed using the glass fiber product as a reinforcing material, and a process for treating the glass fiber.

BACKGROUND ART

Reinforcing fibers such as a glass fiber have been conventionally widely used as a reinforcing material for rubber articles such as a rubber belt, a tire and the like.

The rubber articles such as the rubber belt may be repeatedly subjected to a flexing stress to cause a flex fatigue, resulting in a reduced performance, a peel-off between the reinforcing material and a rubber matrix and a wearing of the reinforcing fiber. Further, the strength is liable to be reduced. Such phenomena tend to be particularly accelerated by a heat and water. In order to prevent a peel-off due to such a flex fatigue and to provide a sufficient reinforcing effect, it is necessary to increase the conformity and adhesion between the reinforcing fiber and the rubber and to provide the rubber article with heat and water resistances. For this purpose, various treating agents may be applied onto the surface of the reinforcing fiber.

For example, in Japanese Patent Application Laid-open No. 221433/89, a treating agent has been proposed which employs, in combination, a water-soluble resorcinol-formaldehyde condensate, a vinylpyridine/butadiene/styrene terpolymer latex, a dicarboxylated butadiene/styrene copolymer latex and a chlorosulfonated polyethylene latex.

The use of such a treating agent makes it possible to satisfy the adhesion between the reinforcing fiber and the rubber matrix and the heat and flex resistances of the treating agent itself to a certain extent, but is accompanied by a disadvantage that when a reinforcing fiber coated with such treating agent is used, sufficiently satisfactory heat, water and flex resistances cannot be obtained because of a insufficient water resistance of the treating agent itself and hence, it is difficult to provide an excellent rubber article.

The present inventors have previously invented and proposed a rubber-reinforcing glass fiber cord coated with a composition consisting essentially of a water-soluble resorcinol/formaldehyde condensate having an improved adhesive strength to a heat-resistant rubber, and a nitrile group-containing highly saturated polymer rubber having an iodine value of 120 or less (see Japanese Patent Application Laid-open No. 270877/88). This invention and proposal have been accomplished by finding that the strength of a rubber film and the adhesive strength to the matrix rubber are enhanced by using a nitrile group-containing highly saturated polymer rubber having an iodine value of 120 or less, preferably 0 to 100.

Even in the above-described invention by the present inventors, a scope for improvement for water and flex resistances has been left.

It is an object of the present invention to provide a reinforcing fiber product in which the disadvantages associated with the prior art are overcome, and which exhibits a large bonding force between a reinforcing fiber and a rubber matrix, and which cannot be reduced in strength, even if it is repeatedly subjected to a flexing stress, and which cannot produce a peel-off between the reinforcing fiber product and the rubber matrix and moreover, has sufficient heat and water resistances.

DISCLOSURE OF THE INVENTION

The present invention embraces following aspects (1) to (7):

(1) A glass fiber coating composition comprising a nitrile group-containing highly saturated polymer rubber latex (A) having an iodine value of 120 or less, a rubber latex (B) other than the highly saturated polymer rubber latex, and a water-soluble resorcinol/formaldehyde condensate in amounts of 15 to 80%, 5 to 70% and 2 to 15%, all by weight in terms of solids, respectively.

(2) A rubber-reinforcing glass fiber product which is coated with a treating agent comprising a nitrile group-containing highly saturated polymer rubber latex (A) having an iodine value of 120 or less, a rubber latex (B) other than the highly saturated polymer rubber latex, and a water-soluble resorcinol/formaldehyde condensate in amounts of 15 to 80%, 5 to 70% and 2 to 15%, all by weight in terms of solids, respectively.

(3) A rubber-reinforcing glass fiber product, which is coated with a treating agent comprising a nitrile group-containing highly saturated polymer rubber latex (A) having an iodine value of 120 or less, a rubber latex (B) other than the highly saturated polymer rubber latex, and a water-soluble resorcinol/formaldehyde condensate in amounts of 15 to 80%, 5 to 70% and 2 to 15%, all by weight in terms of solids, respectively, and which is further coated with a halogen-containing polymer-based adhesive solution.

(4) A rubber article made using a glass fiber product which is coated with a treating agent comprising a nitrile group-containing highly saturated polymer rubber latex (A) having an iodine value of 120 or less, a rubber latex (B) other than the highly saturated polymer rubber latex, and a water-soluble resorcinol/formaldehyde condensate in amounts of 15 to 80%, 5 to 70% and 2 to 15%, all by weight in terms of solids, respectively.

(5) A rubber article made using a glass fiber product which is coated with a treating agent comprising a nitrile group-containing highly saturated polymer rubber latex (A) having an iodine value of 120 or less, a rubber latex (B) other than the highly saturated polymer rubber latex, and a water-soluble resorcinol/formaldehyde condensate in amounts of 15 to 80%, 5 to 70% and 2 to 15%, all by weight in terms of solids, respectively, and which is further coated with a halogen-containing polymer-based adhesive solution.

(6) A process for coating a rubber-reinforcing glass fiber product, comprising the step of coating the rubber-reinforcing glass fiber product with a treating agent which comprises a nitrile group-containing highly saturated polymer rubber latex (A) having an iodine value of 120 or less, a rubber latex (B) other than the highly saturated polymer rubber latex, and a water-soluble resorcinol/formaldehyde condensate in amounts of 15 to 80%, 5 to 70% and 2 to 15%, all by weight in terms of solids, respectively.

(7) A process for coating a rubber-reinforcing glass fiber product, comprising the steps of coating the rubber-reinforcing glass fiber product with a treating agent which comprises a nitrile group-containing highly saturated polymer rubber latex (A) having an iodine value of 120 or less, a rubber latex (B) other than the highly saturated polymer rubber latex, and a water-soluble resorcinol/ formaldehyde condensate in amounts of 15 to 80%, 5 to 70% and 2 to 15%, all by weight in terms of solids, respectively, and coating the resulting product with a halogen-containing polymer-based adhesive solution.

The present invention will now be described in further detail.

The nitrile group-containing highly saturated polymer rubber latex (A) used in the present invention is required to have an iodine value of 120 or less, preferably, in a range of 0 to 100 from the viewpoints of strength of a rubber film and adhesive strength to the matrix rubber. A preferred example of the latex which may be used is Zetpole Latex 2020 (which has an iodine value of 28, and which is made by Nippon Zeon Co., Corp.). It should be noted that the iodine value was determined according to JIS K0070. The nitrile group-containing highly saturated polymer rubbers (A) includes a rubber made by hydrogenating a conjugated diene unit moiety of an unsaturated nitrile/conjugated diene copolymer rubbers; an unsaturated nitrile/conjugated diene/ ethylenically unsaturated monomer tridimensional copolymer rubber and the derivatives made by hydrogenation thereof; an unsaturated nitrile/ethylenically unsaturated monomer based copolymer rubber. The unsaturated nitrile/ ethylenically unsaturated monomer based copolymer rubber may be a rubber made by substituting a portion of the unsaturated monomer by a non-conjugated diene such as vinyl-norbornene, dicyclopentadiene, and 1,4-hexadiene, and then subjecting the resulting substance to a copolymerization.

Specified examples of these nitrile group-containing highly saturated polymer rubbers (A) are those made by hydrogenating a butadiene/acrylonitrile copolymer rubber, an isoprene/butadiene/acrylonitrile copolymer rubber, an isoprene/acrylonitrile copolymer rubber; a butadiene/ methylacrylate/acrylonitrile copolymer rubber, a butadiene/ acrylic acid/acrylonitrile copolymer rubber, etc., and the derivatives made by hydrogenation thereof; a butadiene/ ethylene/acrylonitrile copolymer rubber, a butylacrylate/ ethoxyethyleacrylate/vinylchloroacetate/acrylonitrile copolymer rubber, a butylacrylate/ethoxyethylacrylate/ vinylnorbornene/acrylonitrile copolymer rubber, and the like. They may be produced using a usual polymerizing technique and a usual hydrogenating process.

Preferred examples of the rubber latices (B) other than the highly saturated rubber latex, which may be used, are a butadiene/styrene copolymer latex, a dicarboxylated butadiene/styrene copolymer latex, a vinylpyridine/ butadiene/styrene terpolymer latex, a chlorosulfonated polyethylene latex, an acrylonitrile/butadiene copolymer latex having an iodine value of 200 or more, and the like. If a mixture of a vinylpyridine/butadiene/styrene terpolymer latex and a chlorosulfonated polyethylene latex, among them, is used, a particularly appropriate effect can be provided. Preferred examples of the latex which may be used are J9040 (which is a trade name and made by Sumitomo Norgatta Co., Corp.), Nipol LX 110 (which is a trade name and made by Nippon Zeon Co., Corp.), and the like.

Particularly suitable examples of the dicarboxylated butadiene/styrene copolymer latex are those containing 20 to 80% by weight of butadiene, 5 to 70% by weight of styrene, and 1 to 10% by weight of an ethylenically unsaturated dicarboxylic acid, including Nipol 2570X5 (which is a trade name and is made by Nippon Zeon Co., Corp.), JSR 0668 (which is a trade name and is made by Nippon Gousei Gomu K.K.) and the like.

The vinylpyridine/butadiene/styrene terpolymer latex which can be used include a large number of such terpolymers well known to those skilled in the art. For example, a terpolymer containing vinylpyridine, butadiene and styrene in a proportion of polymerization of 10–20:60–80:10–20 is particularly preferred, such as Nipol 2518FS (which is a trade name and is made by Nippon Zeon Co., Corp.), Pyratex (which is a trade name and is made by Sumitomo Norgatta Co., Corp.) and the like.

Particularly suitable examples of the chlorosulfonated polyethylene latex are those containing 25 to 43% by weight of chlorine and 1.0 to 1.5% by weight of sulfur, such as Esprene (which is a trade name and is made by Sumitomo Chemical Co., Ltd.).

Particularly suitable examples of the acrylonitrile/ butadiene copolymer latex having an iodine value of 200 or more are those having a bound-acrylonitrile content of 36 to 43% by weight, such Nipol 1561 (which is a trade name and is made by Nippon Zeon Co., Corp.), and the like.

Suitable examples of the water-soluble resorcinol-formaldehyde condensate (which will be referred to as RF hereinafter) which may be used in the present invention are resorcinol-based water-soluble addition condensate produced from a reaction of resorcinol and formaldehyde in the presence of an alkaline catalyst such as alkali hydroxide and an amine. Particularly, it is desirable to use a condensate produced from a reaction of resorcinol (R) and formaldehyde (F) at a reaction mole ratio R/F of 1:0.53-3.

According to the present invention, a nitrile group-containing highly saturated polymer rubber latex (A) having an iodine value of 120 or less, a rubber latex (B) and a water-soluble resorcinol/formaldehyde condensate are mixed homogeneously in amounts of 15 to 80%, 5 to 70% and 2 to 15% by weight in terms of solids, respectively. A more preferable proportion of incorporation is such that the amount of the component (A) is of 30 to 70% by weight; the amount of the component (B) is of 20 to 60% by weight, and the amount of the condensate is of 3 to 12% by weight. If the proportion of the nitrile group-containing highly saturated polymer rubber latex in the treating agent is less than 15% by weight or exceeds 80% by weight, the resulting treating agent will have unimproved heat-, water- and flex-resistances. If the amount of RF exceeds 12% by weight, a coating of the resulting treating agent of the present invention will be hardened and hence, sufficient flex-fatigue resistance cannot be obtained. If the amount of RF is less than 3% by weight, a sufficient adhesion between the reinforcing fiber and the rubber matrix cannot be obtained. If the amount of the rubber latex (B) exceeds 70% by weight, a sufficient heat and flex resistances cannot be obtained. If the amount of the rubber latex (B) is less than 3% by weight, a sufficient water resistance cannot be obtained.

The solid concentration of the treating agent according to the present invention is suitable to be 10 to 40% by weight, preferably, 20 to 30% by weight. If the concentration is too low, the treating agent may be insufficiently deposited on the reinforcing fiber. On the other hand, if the concentration is too high, it is difficult to control the amount of treating agent deposited on the reinforcing fiber, resulting in a difficulty to provide a reinforcing fiber product with the treating agent deposited thereon in a uniform amount.

According to the present invention, the treating agent comprises the nitrile group-containing highly saturated polymer rubber latex (A), the rubber latex (B) and the RF as essential components, but if required, a base for adjusting pH, e.g., ammonia, may be incorporated into the treating agent and further, other additives such as a stabilizer, an age resistor and the like may be incorporated into the treating agent.

According to the present invention, the essential components of the treating agent are coated onto a glass fiber strand by immersing a glass fiber, particularly, a strand-like glass fiber into the treating agent, removing an excessive treating agent and then, if required, drying the resulting material. In this case, greige goods, which are usually applied in spinning of a glass fiber, may be either applied, or not applied to the glass fiber strand. Then, a desired number of glass fiber strands are collected and subjected to a twisting to provide a glass fiber cord. The glass fiber cord is embedded into an unvulcanized rubber substrate in a known manner and then heated and vulcanized under pressurization.

According to the present invention, the treating agent is applied to the glass fiber cord, usually in an amount of 10 to 30% by weight in terms of solids based on the glass fiber cord.

The type of the rubber to be reinforced with the glass fiber cord according to the present invention is particularly not limited, but illustrative of such rubbers are a chloroprene rubber, an acrylonitrile/butadiene rubber, a chlorosulfonated polyethylene rubber, a hydrogenated nitrile rubber and the like. When these rubbers are used, an extremely appropriate effect can be obtained.

When a chlorosulfonated polyethylene rubber or a hydrogenated nitrile rubber is used as a rubber to be reinforced, the glass fiber cord according to the present invention, preferably, is further coated with an adhesive solution containing a halogen-containing polymer such as described above, an isocyanate compound, carbon black, a vulcanizing agent and the like, prior to application to such rubbers, in order to further enhance the adhesive property.

More specifically, according to the present invention, if the treating agent is used as a primary coating agent, a halogen-containing polymer based adhesive solution can be further used as a secondary coating agent on the glass fiber treated with such primary coating agent. The halogen-containing polymer based adhesive solution comprises a mixture containing an organic di-isocyanate, a chlorosulfonated polyethylene and an aromatic nitroso compound.

A secondary coating layer made by application of the secondary coating agent can be formed by applying, for example, a solution of an organic di-isocyanate, a chlorosulfonated polyethylene and an aromatic nitroso compound dissolved in an organic solvent onto a glass fiber cord coated with a primary coating agent such as described above.

Preferred examples of the organic di-isocyanates are hexamethylene di-isocyanate, isophoron di-isocyanate, methylene-bis-(4-cyclohexyl isocyanate), toluene di-isocyanate, xylene di-isocyanate, naphthalene di-isocyanate, methylene-bis-(phenyl isocyanate) and the like. They may be used in a combination of two or more of them. If the organic di-isocyanates have isomers with substituent groups, as is the case with toluene di-isocyanate and methylene-bis-(phenyl isocyanate), a mixture of such isomers may be used. These organic di-isocyanates can be also used in the form with the isocyanate group protected by phenol or lactum. The organic di-isocyanate in the form protected in such a manner is advantageously used, when the secondary coating agent is used in the form of a mixture in an aqueous medium such as an aqueous emulsion.

A chlorosulfonated polyethylene having, for example, a chlorine content of 20 to 45% by weight and a sulfonyl sulfur content of 1 to 2.5% by weight, can be usually used as the above-described chlorosulfonated polyethylene. Particularly, a chlorosulfonated polyethylene having, for example, a chlorine content of 25 to 45% by weight and a sulfonyl sulfur content of 1.0 to 1.5% by weight, is advantageously used. In addition, a preferred chlorosulfonated polyethylene exhibits Mooney viscosity of 20 to 50 ML1+4 (at 100° C.). The chlorosulfonated polyethylene is soluble very well in aromatic hydrocarbons such as benzene, toluene and xylene, and a halogenated hydrocarbons such as trichloroethylene.

The aromatic nitroso compound may be any of hydrocarbons such as benzene, naphthalene, anthracene and biphenyl which have at least two nitroso groups directly bonded to non-adjacent carbon atoms in a ring. More specifically, such a nitroso compound is represented as an aromatic poly-C-nitroso compound which has one or three aromatic nuclei including condensed aromatic nuclei and has two or six nitroso groups directly bonded to non-adjacent nucleus carbon atoms. Preferred poly-C-nitroso compounds are aromatic di-nitroso compounds, particularly, di-nitroso benzenes or di-nitroso naphthalenes such as aromatic meta- or para-di-nitroso benznen or aromatic meta- or para-di-nitroso naphthalene. The hydrogen atom in an aromatic nucleus can be substituted by a substituent such as alkyl, alkoxy, cycloalkoxy, aryl, aryl alkyl, alkyryl, arylamines, arylnitroso, amine, halogens (fluorine, chlorine, bromine and iodine) and the like. The presence of such a substituent on the aromatic nucleus exerts little influence to the active effect of the poly-C-nitroso compound used in the present invention. Insofar as being presently known, the nature of the substituent is not limited in any way, whether the substituent is an organic or inorganic group. It should be understood that when the poly-C-nitroso benzene or poly-C-nitroso naphthalene is referred to, it embraces both of a substituted nitroso compound and a non-substituted nitroso compound, unless otherwise defined.

An especially preferred poly-C-nitroso compound is a compound represented by a general formula:

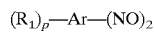

wherein Ar is selected from a group consisting of phenylenes and naphthalenes; $R_1$ is a monovalent organic radical selected from a group consisting of alkyl, cycloalkyl, aryl, arylalkyl, alkyryl, arylamine, alkoxy groups having 1 to 20 carbon atoms, amino group and halogens (fluorine, chlorine, bromine and iodine), and preferably, an alkyl group having 1 to 6 carbon atoms; and p is 0, 1, 2, 3 or 4, preferably, 0.

Preferred partial and non-limited examples of the poly-C-nitroso compounds suitable in carrying out the present invention are m-di-nitroso benzene, p-di-nitroso benzene, m-di-nitroso naphthalene, p-di-nitroso naphthalene, 2,5-di-nitroso-p-cymene, 2-methyl-1,4-di-nitroso benzene, 2-methyl-5-chloro-1,4-di-nitroso benzene, 2-fluoro-1,4-di-nitroso benzene, 2-methoxy-1,3-di-nitroso benzene, 5-chloro-1,3-di-nitroso benzene, 2-benzyl-1,4-di-nitroso benzene, and 2-cyclohexyl-1,4-di-nitroso benzene.

The secondary coating agent may contain an isocyanate, a chlorosulfonated polyethylene and an aromatic nitroso compound. The secondary coating agent further may contain, or rather desirably contains inorganic filler or fillers. Illustrative of the inorganic fillers are carbon black, magnesium oxide, silica, lead oxides, and magnesium carbonate. Among them, carbon black is especially preferred.

The secondary coating agent may be prepared in the form of a solution or a dispersion having a solid content of 3 to 25% by weight, more preferably, 5 to 15% by weight. The organic di-isocyanate occupies a solid content of preferably 10 to 50%, more preferably, 25 to 45% by weight. The chlorosulfonated polyethylene occupies a solid content of preferably 10 to 60%, more preferably, 20 to 50% by weight. The aromatic nitroso compound occupies a solid content of preferably 1 to 20%, more preferably, 2 to 15% by weight. The inorganic filler occupies a solid content of preferably at most 30%, more preferably, 5 to 20% by weight.

The secondary coating agent is applied usually in the form of a solution or a dispersion having a solid content of 1 to 5% by weight (preferably 2 to 4% by weight onto a glass fiber cord having a primary coating layer thereon, and then dried for 0.1 to 1 minute at a temperature of 80 to 150° C. to provide a secondary coating layer on the primary coating layer of the glass fiber cord.

A rubber article produced using a glass fiber product according to the present invention as a reinforcing material has excellent resistances to heat, flex-fatigue and water. Therefore, the glass fiber product according to the present invention can be used extremely appropriately as a reinforcing fiber used, for example, for a timing belt, a toothed belt, a rubber tire and the like in an automobile, which may be subjected to a flexing stress under an environment influenced by a heat and water.

BEST MODE FOR CARRYING OUT THE INVENTION

The present invention will now be described in further detail by way of Examples.

Example 1

(1) Non-alkali glass filaments having a diameter of 9 $\mu$m were spinned and collected with greige goods to provide a glass strand of 33.7 tex. The three strands were doubled to provide a glass fiber product. A treating agent comprising a following composition was applied to the glass fiber product, so that the deposited amount were of 20% by weight, and the resulting material was subjected to a thermal treatment for 2 minutes at 280° C. Water-soluble resorcinol/formaldehyde condensate (R/F=1/1.5, a solid content of 8% by weight) 30% by weight Vinylpyridine/butadiene/styrene terpolymer latex (Nipol 2518FS a solid content of 40% by weight) 30% by weight Nitrile group-containing highly saturated polymer latex (Zetpole Latex 2020, an iodine value of 28, a solid content of 40% by weight) 35% by weight 25% ammonia water 1% by weight

| | |
|---|---|
| 25% ammonia water | 1% by weight |
| Water | 4% by weight |
| Total | 100% by weight |

Then, the glass fiber bundle was subjected to a primary twisting in a Z direction (S direction) in 2.1 twists per 1 inch. Eleven primarily twisted fiber bundles were doubled and subjected to a final twisting in an S direction (Z direction) in 2.1 twists per 1 inch, thereby producing a glass fiber cord of ECG 150 3/11 2.1 S(Z).

The ECG 150 3/11 2.1 S(Z) will be described below. E represents non-alkali glass; C represents a long fiber; G means that the diameter of the filament is about 9 $\mu$m; 150 means that the strand is of 15,000 yards/pound; a numerator 3 of 3/11 represents the number of strands to be primarily twisted; a denominator 11 of 3/11 represents the number of primarily twisted bundles to be finally twisted; and 2.1 S (Z) means that eleven primarily twisted fiber bundles are doubled and subjected to a final twisting in an S direction (z direction) in 2.1 twists per 1 inch.

Using this cord as a reinforcing fiber and a rubber having a formulation given in Table 1, a toothed belt having a width of 19 mm and a length of 980 mm was fabricated.

TABLE 1

| Rubber formulation | |
|---|---|
| Chemicals incorporated | Part by weight |
| Chloroprene rubber *[1] | 100 |
| Magnesium oxide | 4 |
| Oil *[2] | 15 |
| Vulcanizing accelerator *[3] | 1.5 |
| Carbon black | 60 |
| Zinc white | 5 |
| Sulfur | 1.0 |
| Stearic acid | 2.5 |

Figure 1:
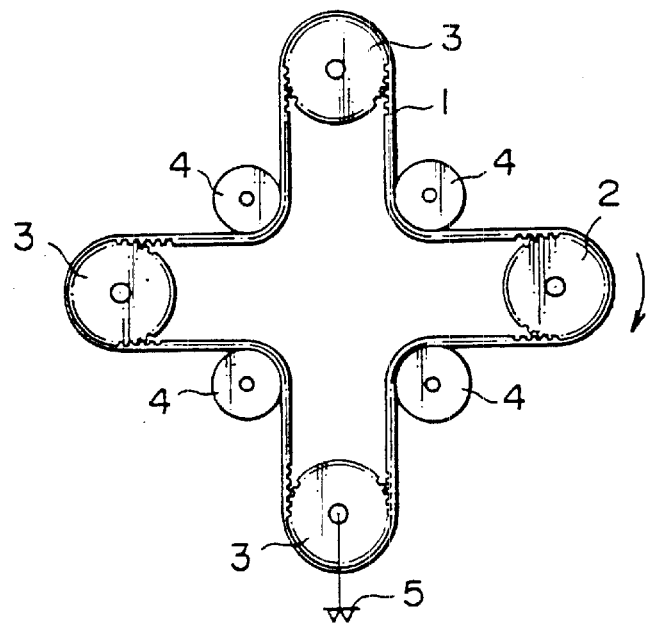
FIG. 1 is a schematic side view of a testing machine for measuring the thermal travel test performance of a toothed belt reinforced with a glass fiber product according to one embodiment of the present invention.

This toothed belt was attached to a heat-resistance travel testing machine equipped with a driving motor of 6,000 rpm shown in FIG. 1. It should be noted that the toothed belt 1, which is a subject to be tested, transmits a driving force of a driving pulley 2 rotatively driven at 6,000 rpm by the driving motor (not shown) to a follower pulley 3. An idler 4 is used to adjust the degree of tension of the toothed belt 1, and a load 5 applied to a shaft of the follower pulley 3 provides a tension to the toothed belt 1.

Figure 2:
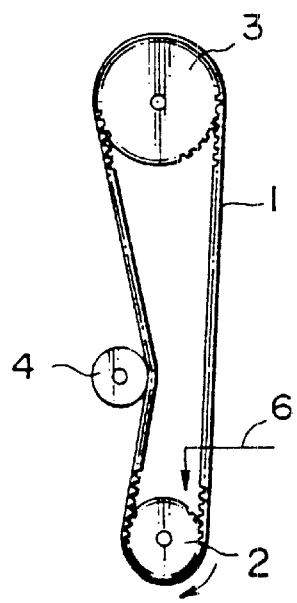
FIG. 2 is a schematic side view of a water injection travel testing machine for measuring the thermal travel test performance of the toothed belt reinforced with a glass fiber product according to one embodiment of the present invention.

A heat-resistance travel test was carried out for 400 hours under an environment at 80° C., and after the test, a tensile strength of the belt was measured to determine a percent based on the tensile strength before the test, i.e., a retention of tensile strength. Further, the toothed belt was attached to a water injection travel testing machine equipped with a driving motor of 6,500 rpm shown in FIG. 2. It should be noted that the toothed belt 1 as a subject to be tested transmits a driving force of a driving pulley 2 rotatively driven at 6,500 rpm by a driving motor (not shown) to a follower pulley 3. An idler pulley 4 for providing a tension to the toothed belt 1 is also used as in FIG. 1. The toothed belt 1 was travelled for 24 hours under an environment at room temperature while dropping water 6 at a rate of 1 liter/hr to a portion of a tooth face of the toothed belt 1 started to be meshed with a tooth face of the follower pulley 3. After the test, a retention of tensile strength of the belt was determined. Results are given in Table 2.

Example 2

Using a treating agent comprising a following composition in place of the composition used in Example 1, a test similar to that in the Example 1 was carried out to provide results given in Table 2.

Water-soluble resorcinol/formaldehyde condensate (R/F=1/1.5, a solid content of 8% by weight) 30% by weight Vinylpyridine/butadiene/styrene terpolymer latex (Nipol 2518FS a solid content of 40% by weight) 35% by weight Nitrile group-containing highly saturated polymer latex (Zetpole Latex 2020, a solid content of 40% by weight) 10% by weight Chlorosulfonated polyethylene latex (Esprene 200, a solid content of 40% by weight) 20% by weight

| | |
|---|---|
| 25% ammonia water | 1% by weight |
| Water | 4% by weight |
| Total | 100% by weight |

Comparative Example 1

Using a treating agent comprising a following composition in place of the composition used in Example 1, a test similar to that in the Example 1 was carried out to provide results given in Table 2.
Water-soluble resorcinol/formaldehyde condensate (R/F=1/1.5, a solid content of 8% by weight) 30% by weight Vinylpyridine/butadiene/styrene terpolymer latex (Nipol 2518FS a solid content of 40% by weight) 30% by weight Dicarboxylated butadiene/styrene copolymer latex (Nipol 2570X5 a solid content of 40% by weight) 15% by weight Chlorosulfonated polyethylene latex (Esprene 200, a solid content of 40% by weight) 20% by weight 25% ammonia water 1% by weight

| | |
|---|---|
| 25% ammonia water | 1% by weight |
| Water | 4% by weight |
| Total | 100% by weight |

TABLE 2

Results of the test for the belt

| | Example | | Com. Example |
|---|---|---|---|
| | 1 | 2 | 1 |
| Retention (%) of tensile strength of the belt after the heat-resistance travel test | 81 | 78 | 72 |
| Retention (%) of tensile strength of the belt after the water injection travel test | 64 | 67 | 51 |

Com. = Comparative

Example 3

The glass fiber cord produced in Example 1 was further coated with a halogen-containing polymer based adhesive solution (which comprises Kemlock 402 (trade name, made by Load Corporation, and a solid content of 14.5%) diluted by toluene), so that the deposited amount was of 3.5% by weight based on the glass fiber cord, and then, the resulting cord was dried. Using this coated glass fiber cord as a reinforcing fiber and a rubber having a formulation given in Table 3, a toothed belt was fabricated, and subjected to a travel test in the same manner as in Example 1, but the heat-resistance travel test temperature was changed from 80° C. to 100° C. Results are given in Table 4.

TABLE 3

| Rubber formulation | |
|---|---|
| Chemicals incorporated | Part by weight |
| Hydrogenated nitrile rubber (Zetpole 2020) | 100 |
| Carbon black | 40 |
| Zinc oxide | 5 |
| Stearic acid | 1 |
| Thiokol TP-95 *1) | 5 |
| Sulfur | 0.5 |
| Tetramethyl thiuram disulfide | 1.5 |
| Cyclohexylbenzothiazy sulfenamide | 1.0 |

Example 4

Using the glass fiber cord produced in Example 2, a toothed belt was fabricated in the same manner as in Example 3, and subjected to a travel test in the same manner as in Example 3. Results are given in Table 4.

Example 5

Using a secondary coating treating solution having a following composition:
Methylene-bis-(4-phenyl isocyanate) 4.5 part by weight Chlorosulfonated polyethylene (made under a trade name of TS-340 by Toyo Soda, Co., Corp., and having a chlorine content of 43% by weight, a sulfur content of 1.1% by weight and Mooney viscosity of 30 (ML1+4 (at 100° C.) 5.25 part by weight p-Dinitrosobenzene 2.25 part by weight Carbon black 3.0 part by weight

| | |
|---|---|
| xylene to trichloroethylene = 1.5/1.0) | 85.0 part by weight |
| Total | 100 part by weight | the glass fiber cord produced in Example 2 was coated therewith, so that the deposited amount (of solids) was of 3.5% by weight based on the glass fiber cord, and the resulting cord was then dried. Using this glass fiber cord as a reinforcing fiber and a rubber having the same formulation as in Table 3, a toothed belt was fabricated and subjected to a travel test, in the same manner as in Example 1, but the heat-resistance travel test temperature was changed from 80° C. to 100° C. Results are given in Table 4.

Comparative Example 2

Using the glass fiber cord produced in Comparative Example 1, a toothed belt was fabricated in the same manner as in Example 3, and subjected to a travel test in the same manner as in Example 3. Results are given in Table 4.

Comparative Example 3

Using a treating agent comprising a following composition:
Water-soluble resorcinol/formaldehyde condensate (R/F=1/1.5, a solid content of 8% by weight) 30% by weight Nitrile-containing highly saturated polymer latex (Zetpole Latex 2020, a solid content of 40% by weight) 60% by weight

| | |
|---|---|
| 25% ammonia water | 1% by weight |
| Water | 4% by weight |
| Total | 100% by weight | in place of the composition used in Example 1, a glass fiber cord was fabricated in the same manner as in Example 1. Using this glass fiber cord, a toothed belt was fabricated in the same manner as in Example 3, and subjected to a travel test in the same manner as in Example 3. Results are given in Table 4.

TABLE 4

Results of the test for the belt

| | Example | | | Com. Example | |
|---|---|---|---|---|---|
| | 3 | 4 | 5 | 2 | 3 |
| Retention (%) of tensile strength of the belt after the heat-resistance travel test | 95 | 93 | 95 | 78 | 93 |
| Retention (%) of tensile strength of the belt after the water injection travel test | 73 | 85 | 87 | 62 | 62 |

INDUSTRIAL APPLICABILITY

If the glass fiber product coated with the coating composition according to the present invention is used for reinforcing a rubber article such as a belt, a tire and the like, the reinforced rubber article has high heat- and water-resistances, and even if the reinforced rubber article is repeatedly subjected to a flexing stress under an environment of a high temperature and a high humidity, it is less reduced in strength and exhibits an excellent performance.

What is claimed is:

1. A rubber-reinforcing glass fiber product which is coated with a treating agent comprising a nitrile group-containing highly saturated polymer rubber latex (A) having an iodine value of 120 or less, a rubber latex (B) other than said highly saturated polymer rubber latex, and a water-soluble resorcinol/formaldehyde condensate in amounts of 15 to 80%, 5 to 70% and 2 to 15%, all by weight in terms of solids, respectively.

2. A rubber-reinforcing glass fiber product according to claim 1, wherein said rubber latex (B) is at least one selected from the group consisting of a butadiene/styrene copolymer latex, a dicarboxylated butadiene/styrene copolymer latex, a vinylpyridine/butadiene/styrene terpolymer latex, a chlorosulfonated polyethylene latex, and an acrylonitrile/butadiene copolymer latex.

3. A rubber-reinforcing glass fiber product according to claim 1, wherein said rubber latex (B) is a mixture of a vinylpyridine/butadiene/styrene terpolymer latex and a chlorosulfonated polyethylene latex.

4. A rubber article made using a glass fiber product which is coated with a treating agent comprising a nitrile group-containing highly saturated polymer rubber latex (A) having an iodine value of 120 or less, a rubber latex (B) other than said highly saturated polymer rubber latex, and a water-soluble resorcinol/formaldehyde condensate in amounts of 15 to 80%, 5 to 70% and 2 to 15%, all by weight in terms of solids, respectively.

5. A rubber article according to claim 4, wherein said rubber latex (B) is at least one selected from the group consisting of a butadiene/styrene copolymer latex, a dicarboxylated butadiene/styrene copolymer latex, a vinylpyridine/butadiene/styrene terpolymer latex, a chlorosulfonated polyethylene latex, and an acrylonitrile/butadiene copolymer latex.

6. A rubber article according to claim 4, wherein said rubber latex (B) is a mixture of a vinylpyridine/butadiene/styrene terpolymer latex and a chlorosulfonated polyethylene latex.

7. A rubber article according to claim 4, wherein said rubber article is a toothed belt.

8. A rubber article according to claim 4, wherein said rubber article is a rubber tire.

9. A rubber article made using a glass fiber product which is coated with a treating agent comprising a nitrile group-containing highly saturated polymer rubber latex (A) having an iodine value of 120 or less, a rubber latex (B) other than said highly saturated polymer rubber latex, and a water-soluble resorcinol/formaldehyde condensate in amounts of 15 to 80%, 5 to 70% and 2 to 15%, all by weight in terms of solids, respectively, and which is further coated with a halogen-containing polymer-based adhesive solution.

10. A rubber article according to claim 9, wherein said rubber latex (B) is at least one selected from the group consisting of a butadiene/styrene copolymer latex, a dicarboxylated butadiene/styrene copolymer latex, a vinylpyridine/butadiene/styrene terpolymer latex, a chlorosulfonated polyethylene latex, and an acrylonitrile/butadiene copolymer latex.

11. A rubber article according to claim 9, wherein said rubber latex (B) is a mixture of a vinylpyridine/butadiene/styrene terpolymer latex and a chlorosulfonated polyethylene latex.

12. A rubber article according to claim 9, wherein said rubber article is a toothed belt.

13. A rubber article according to claim 9, wherein said rubber article is a rubber tire.

14. A process for coating a rubber-reinforcing glass fiber product, comprising the step of coating the rubber-reinforcing glass fiber product with a treating agent which comprises a nitrile group-containing highly saturated polymer rubber latex (A) having an iodine value of 120 or less, a rubber latex (B) other than said highly saturated polymer rubber latex, and a water-soluble resorcinol/formaldehyde condensate in amounts of 15 to 80%, 5 to 70% and 2 to 15%, all by weight in terms of solids, respectively.

15. A process for coating a rubber-reinforcing glass fiber product according to claim 14, wherein said rubber latex (B) is at least one selected from the group consisting of a butadiene/styrene copolymer latex, a dicarboxylated butadiene/styrene copolymer latex, a vinylpyridine/butadiene/styrene terpolymer latex, a chlorosulfonated polyethylene latex, and an acrylonitrile/butadiene copolymer latex.

16. A rubber article according to claim 14, wherein said rubber latex (B) is a mixture of a vinylpyridine/butadiene/styrene terpolymer latex and a chlorosulfonated polyethylene latex.

* * * * *

UNITED STATES PATENT AND TRADEMARK OFFICE
CERTIFICATE OF CORRECTION

PATENT NO.    : 6,468,654 B1
DATED         : October 22, 2002
INVENTOR(S)   : Okamura et al.

It is certified that error appears in the above-identified patent and that said Letters Patent is hereby corrected as shown below:

Column 8,
Between lines 30 and 31, insert the following:
-- *1) Neoprene GW (trade name) made by du Pond de Nemours. E.I., and Co.
*2) Mineral oil (Naphthenic process oil)
*3) 2-mercaptoimidazoline --.

Column 10,
Between lines 15 and 16, insert the following:
-- *1) A trade name of a high molecular type polyester based plasticizer made by Toray Industries, Inc. --.
Line 36, delete "xylene" and insert -- Mixed solvent of xylene and trichloroethylene (ratio of xylene to trichloroethylene = 1.5/1.0) --.

Signed and Sealed this

Twenty-fifth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,468,654 B1
DATED         : October 22, 2002
INVENTOR(S)   : Okamura et al.

It is certified that error appears in the above-identified patent and that said Letters Patent is hereby corrected as shown below:

<u>Title page,</u>
Insert the following:
-- (30)           Foreign Application Priority Data
Dec. 1, 1992     (JP).............4-321504 --.

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.       : 6,468,654 B1
APPLICATION NO.  : 09/133562
DATED            : October 22, 2002
INVENTOR(S)      : Okamura et al.

It is certified that error appears in the above-identified patent and that said Letters Patent is hereby corrected as shown below:

On the Title Page insert the following:

--[22]  PCT Filed: Nov. 29, 1993

[86]  PCT No.: PCT JP93/01731

§ 371 DATE: Jun. 14, 1994

§ 102(e) Date: Jun. 14, 1994

[87]  PCT Pub. No.: WO94/12443

PCT Pub. Date: Jun. 9, 1994--

Signed and Sealed this

Nineteenth Day of September, 2006

JON W. DUDAS
*Director of the United States Patent and Trademark Office*